(12) United States Patent
O'Brien, Jr.

(10) Patent No.: US 7,277,573 B1
(45) Date of Patent: Oct. 2, 2007

(54) ENHANCED RANDOMNESS ASSESSMENT METHOD FOR THREE-DIMENSIONS

(75) Inventor: Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 668 days.

(21) Appl. No.: 10/911,757

(22) Filed: Jul. 30, 2004

(51) Int. Cl.
*G06K 9/00* (2006.01)

(52) U.S. Cl. ........................ 382/154; 382/228
(58) Field of Classification Search ............... 382/154, 382/218, 228; 345/419–420
See application file for complete search history.

(56) References Cited

U.S. PATENT DOCUMENTS 6,466,516 B1 * 10/2002 O'Brien et al. ............. 367/131

6,980,926 B1 * 12/2005 O'Brien, Jr. ................ 702/179

\* cited by examiner

*Primary Examiner*—Daniel Mariam
(74) *Attorney, Agent, or Firm*—James M. Kasischke; Michael P. Stanley; Jean-Paul A. Nasser (57) ABSTRACT

A multi-stage method is provided for automatically characterizing data sets containing data points which are each defined by measurements of three variables as either random or non-random. A three-dimensional Cartesian volume which is sized to contain all of a total number N of data points in the data set which is to be characterized. The Cartesian volume is partitioned into equal sized cubes, wherein each cube may or may not contain a data point. A predetermined route is defined that goes through every cube one time and scores each cube as a one or a zero thereby producing a stream of ones and zeros. The number of runs is counted and utilized to provide a Runs Test which predicts if the N data points in any data set are random or nonrandom. Additional tests are used in conjunction with the Runs Test to increase the accuracy of characterization of each data set as random or nonrandom.

16 Claims, 3 Drawing Sheets

ENHANCED RANDOMNESS ASSESSMENT METHOD FOR THREE-DIMENSIONS

STATEMENT OF GOVERNMENT INTEREST

The invention described herein may be manufactured and used by or for the Government of the United States of America for Governmental purposes without the payment of any royalties thereon or therefore.

CROSS REFERENCE TO RELATED PATENT APPLICATIONS

Related applications include the following co-pending applications: application of F. J. O'Brien, Jr. entitled "Detection of Randomness in Sparse Data Set of Three Dimensional Time Series Distributions," Ser. No. 10/679,866, filed 6 Oct. 2003 (Navy Case 83996); application of F. J. O'Brien, Jr. entitled "Method for Detecting a Spatial Random Process Using Planar Convex Polygon Envelope," filed on even date with the present application (Navy Case 83047); application of F. J. O'Brien, Jr. entitled "Multi-Stage Planar Stochastic Mensuration," filed on even date with the present invention (Navy Case 83992); application of F. J. O'Brien, Jr. entitled "Enhanced System for Detection of Randomness in Sparse Time Series Distributions," filed on even date with the present invention (Navy Case 83995); and application of F. J. O'Brien, Jr. entitled "Method for Sparse Data Two-Stage Stochastic Mensuration," filed on even date with the present application (Navy Case 84264).

BACKGROUND OF THE INVENTION (1) Field of the Invention

The present invention relates generally to the field of sonar signal processing and, more particularly, preferably comprises a multistage and automated method to measure the spatial arrangement among a very small number of measurements whereby an ascertainment of the mathematical property of randomness (or noise-degree) may be made.

(2) Description of the Prior Art

Naval sonar systems require that signals be classified according to structure; i.e., periodic, transient, random or chaotic. In many cases it may be highly desirable and/or critical to know whether data received by a sonar system is simply random noise, which may be a false alarm, or is more likely due to detection of a submarine or other vessel of interest.

Recent research has revealed a critical need for highly sparse-data-set statistical methods separate and apart from those treating large samples. It is well known that large sample methods often fail when applied to small sample distributions. In some cases, prior art statistical methods may label an obviously nonrandom distributions (e.g., see FIG. 2) as random. It is apparently not well known or appreciated that a single measurement system designed to detect stochastic randomness occasionally fails for certain distributions. For example, the method of U.S. patent application Ser. No. 09/934,343, now U.S. Pat. No. 6,597,634, which is incorporated herein by reference, fails to detect non-randomness in data such as displayed in FIG. 2. Most randomness assessment methods are applicable for truly random distributions, and sometimes fail to label correctly truly nonrandom distributions as pointed out by Dr. Rushkin (A. L. Rushkin, Testing Randomness: A Suite of Statistical Procedures, Theory of Probability and its Applications, 2000, vol. 45, no. 1, pp. 111-132). As an example, it is quite possible for the Runs Test (described below) to label an error-free constant two-dimensional function, such as $f(x)=x$, "nonrandom," while an error-free linear function, such as $f(x)=a+bx$, is deemed "random."

Very small data distributions may comprise data sets with approximately less than ten to fifteen data measurements. Such data sets can be analyzed mathematically with certain nonparametric discrete probability distributions as opposed to large-sample methods, which employ continuous probability distributions (such as the Gaussian).

Nonparametric statistics is a field that treats discrete variables or a quantitative variable whose set of possible values is countable. Typical examples of discrete variables are variables whose possible values are a subset of the integers, such as the number of bacteria in a microphotograph, discrete time increments $[t_0=0, t_1=1, t_2=2, \ldots ]$, number of "heads" in 10 coin-flips, the USA population, ages rounded to the nearest year, or the number of pages in a DoD Technical Manual. Moreover, a random variable is discrete if and only if its cumulative probability distribution function is a stair-step function; i.e., if it is piecewise constant and only increases by discrete jumps.

Nonparametric probability and statistical methods were developed to be used in cases when the researcher does not know the parameters of the distribution of the variable of interest in the population (hence the name nonparametric). In other terms, nonparametric methods do not rely on the estimation of parameters (such as the mean or the standard deviation) describing the distribution of the variable of interest in the population. Therefore, these methods are also sometimes (and more appropriately) called parameter-free methods or distribution-free.

General probability theory related hereto is found in Feller, W. An Introduction to Probability Theory and Its Application, Vol. 1, 3rd Ed. New York: Wiley, 1968. The Theory of Runs (developed later in the disclosure) is described in Mood, A. M. "The Distribution Theory of Runs," Ann. Math. Statistics 11, 367-392, 1940. It is also noted that recent research has revealed a critical heed for highly sparse data set time distribution analysis methods and apparatus separate and apart from those adapted for treating large sample distributions. P. J. Hoel et al., Introduction to the Theory of Probability, Boston, Houghton-Mifflin, 1971 is incorporated herein by reference. An example of the Runs Test is described in G. H. Moore & W. A. Wallis, 1943, "Time Series Significance Tests Based on Signs of Difference", Journal of the American Statistical Association, vol. 39, pages 153-164, and is incorporated herein by reference.

Examples of exemplary patents related to the general field of the endeavor of analysis of sonar signals include:

U.S. Pat. No. 5,675,553, issued Oct. 7, 1997, to O'Brien, Jr. et al., discloses a method for filling in missing data intelligence in a quantified time-dependent data signal that is generated by, e.g., an underwater acoustic sensing device. In accordance with one embodiment of the invention, this quantified time-dependent data signal is analyzed to determine the number and location of any intervals of missing data, i.e., gaps in the time series data signal caused by noise in the sensing equipment or the local environment. The quantified time-dependent data signal is also modified by a low pass filter to remove any undesirable high frequency noise components within the signal. A plurality of mathematical models are then individually tested to derive an optimum regression curve for that model, relative to a selected portion of the signal data immediately preceding each previously identified data gap. The aforesaid selected portion is empirically determined on the basis of a data base of signal values compiled from actual undersea propagated signals received in cases of known target motion scenarios. An optimum regression curve is that regression curve, linear or nonlinear, for which a mathematical convergence of the model is achieved. Convergence of the model is determined by application of a smallest root-mean-square analysis to each of the plurality of models tested. Once a model possessing the smallest root-mean-square value is derived from among the plurality of models tested, that optimum model is then selected, recorded, and stored for use in filling the data gap. This process is then repeated for each subsequent data gap until all of the identified data gaps are filled.

U.S. Pat. No. 5,703,906, issued Dec. 30, 1997, to O'Brien, Jr. et al., discloses a signal processing system which processes a digital signal, generally in response to an analog signal which includes a noise component and possibly also an information component representing three mutually orthogonal items of measurement information represented as a sample point in a symbolic Cartesian three-dimensional spatial reference system. A noise likelihood determination sub-system receives the digital signal and generates a random noise assessment of whether or not the digital signal comprises solely random noise, and if not, generates an assessment of degree-of-randomness. The noise likelihood determination controls the operation of an information processing sub-system for extracting the information component in response to the random noise assessment or a combination of the random noise assessment and the degree-of-randomness assessment. The information processing system is illustrated as combat control equipment for submarine warfare, which utilizes a sonar signal produced by a towed linear transducer array, and whose mode operation employs three orthogonally related dimensions of data, namely: (i) clock time associated with the interval of time over which the sample point measurements are taken, (ii) conical angle representing bearing of a passive sonar contact derived from the signal produced by the towed array, and (iii) a frequency characteristic of the sonar signal.

U.S. Pat. No. 5,966,414, issued Oct. 12, 1999, to Francis J. O'Brien, Jr., discloses a signal processing system which processes a digital signal generated in response to an analog signal which includes a noise component and possibly also an information component. An information processing sub-system receives said digital signal and processes it to extract the information component. A noise likelihood determination sub-system receives the digital signal and generates a random noise assessment that the digital signal comprises solely random noise, and controls the operation of the information processing sub-system in response to the random noise assessment.

U.S. Pat. No. 5,781,460, issued Jul. 14, 1998, to Nguyen et al., discloses a chaotic signal processing system which receives an input signal from a sensor in a chaotic environment and performs a processing operation in connection therewith to provide an output useful in identifying one of a plurality of chaotic processes in the chaotic environment. The chaotic signal processing system comprises an input section, a processing section and a control section. The input section is responsive to input data selection information for providing a digital data stream selectively representative of the input signal provided by the sensor or a synthetic input representative of a selected chaotic process. The processing section includes a plurality of processing modules each for receiving the digital data stream from the input means and for generating therefrom an output useful in identifying one of a plurality of chaotic processes. The processing section is responsive to processing selection information to select one of the plurality of processing modules to provide the output. The control module generates the input data selection information and the processing selection information in response to inputs provided by an operator.

U.S. Pat. No. 5,963,591, issued Oct. 5, 1999, to O'Brien, Jr. et al., discloses a signal processing system which processes a digital signal generally in response to an analog signal which includes a noise component and possibly also an information component representing four mutually orthogonal items of measurement information representable as a sample point in a symbolic four-dimensional hyperspatial reference system. An information processing and decision sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The noise likelihood determination system controls whether or not the information processing and decision sub-system is used, in response to one or both of these generated outputs. One prospective practical application of the invention is the performance of a triage function upon signals from sonar receivers aboard naval submarines, to determine suitability of the signal for feeding to a subsequent contact localization and motion analysis (CLMA) stage.

U.S. Pat. No. 6,397,234, issued May 28, 2002, to O'Brien, Jr. et al., discloses a method and apparatus are provided for automatically characterizing the spatial arrangement among the data points of a time series distribution in a data processing system wherein the classification of said time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or non-random, and/or random or nonrandom.

U.S. Pat. No. 5,757,675, issued May 26, 1998, to O'Brien, Jr., discloses an improved method for laying out a workspace using the prior art crowding index, PDI, where the average interpoint distance between the personnel and/or equipment to be laid out can be determined. The improvement lies in using the convex hull area of the distribution of points being laid out within the workplace space to calculate the actual crowding index for the workspace. The convex hull area is that area having a boundary line connecting pairs of points being laid out such that no line connecting any pair of points crosses the boundary line. The calculation of the convex hull area is illustrated using Pick's theorem with additional methods using the Surveyor's Area formula and Hero's formula.

U.S. Pat. No. 6,466,516, issued Oct. 5, 1999, to O'Brien, Jr. et al., discloses a method and apparatus for automatically characterizing the spatial arrangement among the data points of a three-dimensional time series distribution in a data processing system wherein the classification of the time series distribution is required. The method and apparatus utilize grids in Cartesian coordinates to determine (1) the number of cubes in the grids containing at least one input data point of the time series distribution; (2) the expected number of cubes which would contain at least one data point in a random distribution in said grids; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom within what probability, prior to its output from the invention to the remainder of the data processing system for further analysis.

U.S. Pat. No. 5,144,595, issued Sep. 1, 1992, to Graham et al., discloses an adaptive statistical filter providing improved performance target motion analysis noise discrimination includes a bank of parallel Kalman filters. Each filter estimates a statistic vector of specific order, which in the exemplary third order bank of filters of the preferred embodiment, respectively constitute coefficients of a constant, linear and quadratic fit. In addition, each filter provides a sum-of-squares residuals performance index. A sequential comparator is disclosed that performs a likelihood ratio test performed pairwise for a given model order and the next lowest, which indicates whether the tested model orders provide significant information above the next model order. The optimum model order is selected based on testing the highest model orders. A robust, unbiased estimate of minimal rank for information retention providing computational efficiency and improved performance noise discrimination is therewith accomplished.

The above cited art, while extremely useful, could be improved with the automated capability of measuring the spatial arrangement for data distributions with a very small number of points, objects, measurements and then labeling nonrandom distributions correctly more often as disclosed utilizing the method taught herein. Consequently, those of skill in the art will appreciate the present invention which addresses these and other problems.

SUMMARY OF THE INVENTION

Accordingly, it is an object of the invention to provide a method for classifying data sets as either random or nonrandom.

It is another object of the present invention to provide a method capable of more accurately a very small number of points, objects, measurements or the like.

Yet another object of the present invention is to provide a useful method for classifying data produced by naval sonar, radar, and/or lidar in aircraft and missile tracking systems as indications of how and from which direction the data was originally generated.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, a method is provided for characterizing data in a three-dimensional space comprising one or more steps, such as for example, providing a number N of data points, selecting a size of the three dimensional-space which contains all of the N data points, and partitioning the three-dimension space into a plurality of smaller three-dimensional subspaces.

In one preferred embodiment, the method comprises a three-dimensional runs test. The runs test runs test may comprise steps such as providing a scoring system whereby each three-dimensional subspace is scored as a zero if no data point is located therein and as a one if at least one data point is located therein. Other steps may comprise providing a predefined route through the three-dimensional space whereby the predefined route passes through every three-dimensional subspace one time. Accordingly, the method may comprise producing a series of ones and zeros by sequentially scoring each subspace along the predefined route with the scoring system. The total number of the ones produced during the predefined measurement route are equal to $n_1$. The total number of the zeros produced during each predefined measurement route being equal to $n_2$. The total number of the three-dimensional subspaces is therefore equal to $n_1+n_2$.

Additional steps may comprise determining a total number of runs, r, in the series of ones and zeros whereby each run is a consecutive sequence of all ones or a consecutive sequence of all zeros. In one embodiment, another step comprises selecting an acceptable false alarm rate a wherein the false alarm rate is a statistical likelihood of labeling the N data points as nonrandom when the N data points are actually random and/or determining a probability p that the number of runs r is within statistically expected range of values for r if the N data points are actually random, and/or comparing p to a for producing a runs test decision that the set of N data points is random or nonrandom.

In a presently preferred embodiment, the three-dimensional space may be described in terms of a three-dimensional Cartesian coordinate system with a x-axis, a y-axis, and a z-axis and the plurality of smaller three-dimensional subspaces may comprises a plurality of equal sized cubes of size $\Delta x=\Delta y=\Delta z$. The predefined measurement route may comprise a plurality of substantially parallel sweep lines which extend through each of a plurality of rows of the equal sized cubes whereby the predefined measurement route passes through each of the plurality of equal sized cubes one time to thereby produce the series of zeros and ones. However, other predefined measurement routes may also be utilized, if desired.

The method may further comprise determining a mean E(r) and variance s if the N data points is random from $n_1$ and $n_2$. The method may further comprise a Gaussian statistic Z, and determining boundaries wherein a random distribution range of the N data points may extend from −z to +z, and determining a probability p whereby if p>a, then the runs test decision is that the set of N data points is random. The method may also comprise additional tests which are utilized by a decision module to further enhance accuracy of the decision as to whether the set of N data points is random. For instance, the method may comprise utilizing an R test and/or utilizing a multiple correlation test. In one preferred embodiment, the method may further comprise labeling the N data points as nonrandom if any one of the runs test, the R test, or the multiple correlation test, or other tests determine that the N data points are, nonrandom.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein.

DESCRIPTION OF THE PREFERRED EMBODIMENT

Figure 1:
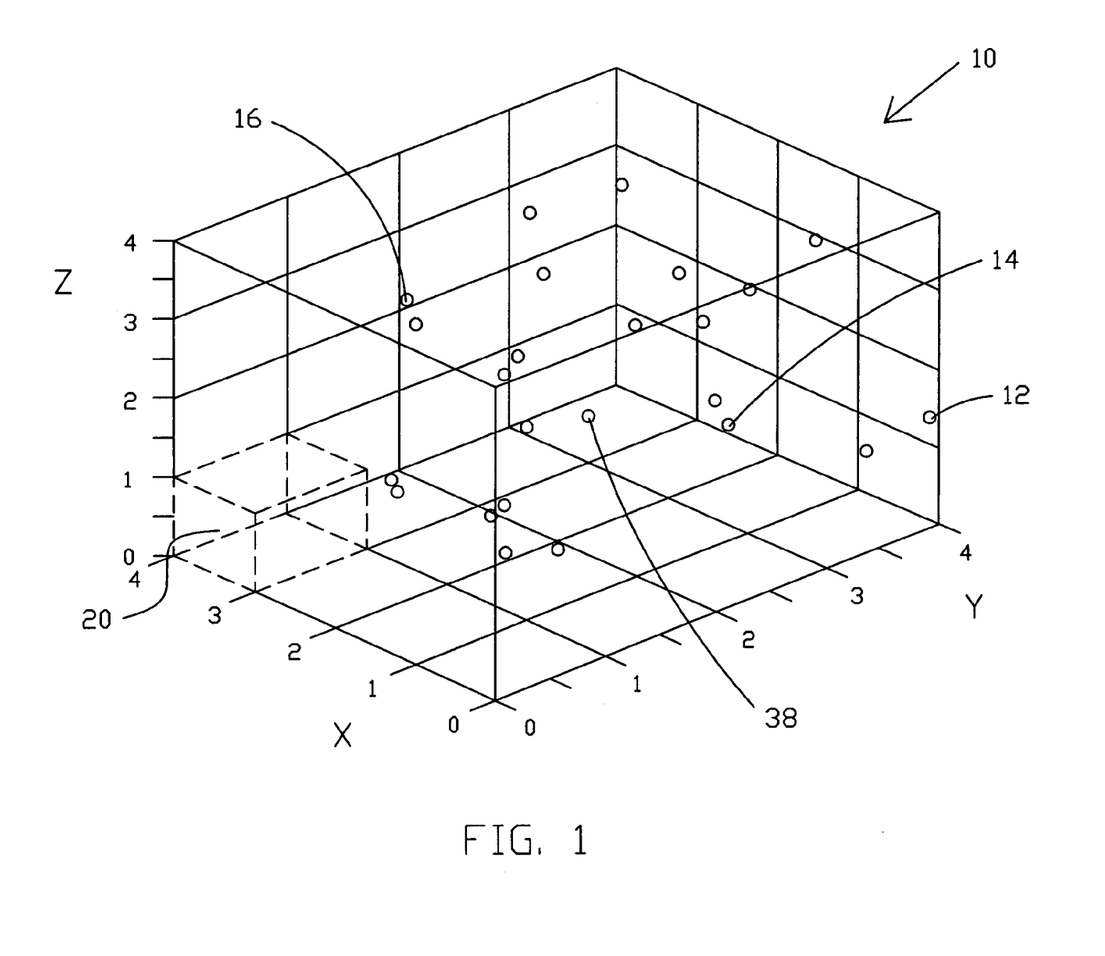
FIG. 1 is a diagram showing a hypothetical random distribution in a three dimensional Cartesian space with N=25 random points plotted for use in a method in accord with the present invention.

A computer-aided multi-stage approach is shown for detecting stochastic (pure) randomness in three-dimensional space. This invention provides a novel means to determine whether the signal structure conforms to a random process (i.e. predominantly random). The specific utility of the method presently disclosed are in processing of data distributions containing a small number of points. The existence of such sparse data sets requires data analysis methods appropriate for processing them reliably and validly. The theoretical framework of the method is known, although the application of theory to practice is often cumbersome. FIG. 1 provides a plot of a random-distribution of points, such as random points 12, 14, and 16, in Cartesian three-dimensional space 10. In the present example, there are twenty-five random points, i.e., N=25. Each representative random point may be denoted in terms such as $x_i$, $y_j$, $z_k$. In the present example, the data points do not represent a time-series, because all variables are randomized. Accordingly, this data distribution is correctly labeled "random" in accord with the inventive method.

Figure 2:
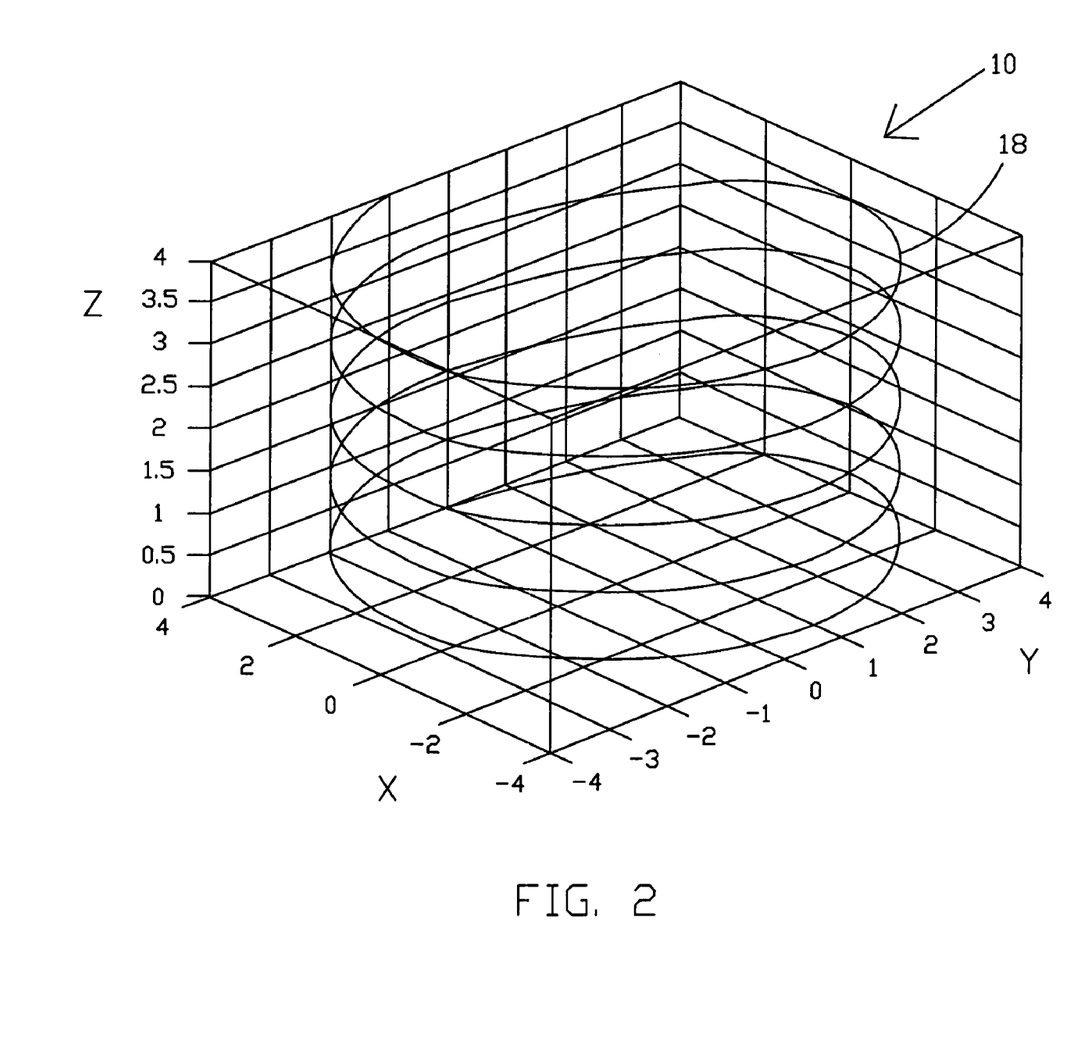
FIG. 2 is a diagram showing simple helix plotted in the three dimensional Cartesian space of FIG. 1 which might be incorrectly classified as random data utilizing prior art techniques.

FIG. 2 shows a curve, such as simple helix 18 within Cartesian three-dimensional space 10. A simple helix may be described as the path followed by a point moving on the surface of a right circular cylinder that moves along the cylinder at a constant ratio as it moves around the cylinder. The parametric equation for a helix is: [x=a cos t; y=a sin t; z=bt]. As discussed hereinbefore, prior art computer methods for analyzing data may label distributions such as simple helix 18 as being random even though it is clear to a human observer that this data is not random. The example of FIG. 2 exemplifies the need for a new inventive method for detecting the widest range of data distributions encountered in naval sonar signal processing.

As a comparison, FIG. 1 gives an indication of what noise or random distribution property might look like for 25 spatial objects plotted in three dimensions for measurement amplitudes in Cartesian space embedded in a finite time series. The X-axis is typically taken as representing "time" in a typical signal processing time series analysis. However, the data points do not represent a time-series, as all data were randomized for purposes of illustration.

In studies where measurements are made according to some well-defined ordering, either in time or space, a frequent question is whether or not the average value of the measurement is different at different points in the sequence. The nonparametric one-sample Runs Test provides a means of testing this structure to determine whether the sample observations are random.

Figure 3:
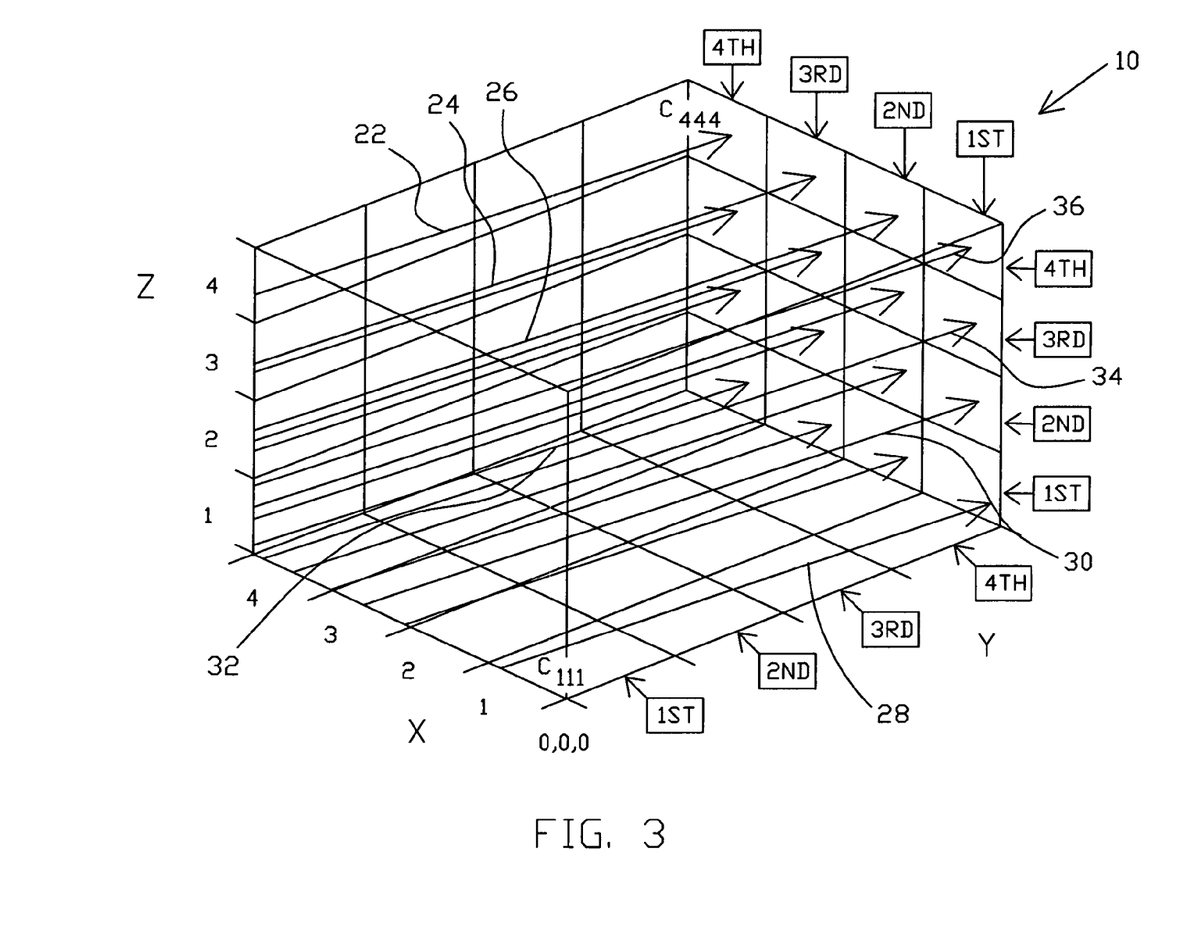
FIG. 3 is a diagram which illustrates a hypothetical symbolic representation of a partitioning scheme with runs routing for binary coding of a three dimensional runs test in accord with the present invention.

In accord with the method of the present invention, for a time series or for other variables, a window is created around a trivariate (X-Y-Z) spatial distribution, such as for example, Cartesian three-dimensional space 10. Cartesian three-dimensional space 10 may typically comprise a time index or other metric and two time-based measurements or other variables. Then one creates numerous small cubic subspaces, such as cubic subspace 20 shown in FIG. 1, on the region defined by as Cartesian three-dimensional space 10. As best indicated in FIG. 3, a systematic sweep is made through each cubic subspace throughout space 10, as might be indicated by sweep arrows, such as sweep arrows 22, 24, and 26. In this case, there would be 16 sweep arrows. As a result of each sweep through a string of cubic subspaces, each subspace is assigned a value of 1 if a point or points are there; otherwise the cell is scored with a value of 0.

Then the number of "runs" is counted in the ordered binary data following the specified sequence of motion through the space. Probability theory allows a determination to be made of whether the total number of runs in a sample is too few or too many so as to be attributable to chance variation (randomness).

A run is a sequence of more than one consecutive identical outcome, also known as a clump. For the present invention, a run is a sequential homogeneous stream of 0 or 1 data followed by a different contiguous stream of homogeneous 0 or 1 data.

Arbitrarily we label the total number of 1s by $n_1$ and the total number of 0s as $n_2$. For example, the following data exhibit: $n_1=9$ 1s and $n_2=13$ 0s. The total sample size is $N=n_1+n_2=22$, and 6 runs:

$$\underbrace{\underset{1}{000} \quad \underset{2}{11} \quad \underset{3}{00000} \quad \underset{4}{1111} \quad \underset{5}{00000} \quad \underset{6}{111}}_{r=6}$$

Here, the sample shows r=6 runs which may be tested for randomness.

In a distribution that is truly a random one, we expect an average or mean number of runs E(r) to occur, namely:

$$E(r) = \frac{2n_1 n_2}{n_1 + n_2} + 1, (n_2 > 10) \qquad (1)$$

with a variance $\sigma^2$ or spread in the number of runs equal to:

$$\sigma_r^2 = \frac{2n_1 n_2 (2n_1 n_2 - n_1 - n_2)}{(n_1+n_2)^2 (n_1+n_2-1)} (n_2 > 10) \qquad (2)$$

To assess statistically the relationship of the sample total number of runs r in three dimensions to the distributional moments, E(r) and $\sigma_r^2$, we submit the sample statistics and, population parameters to a Gaussian test statistic, Z, in the following manner:

$$Z = \frac{r - E(r)}{\sqrt{\sigma_r^2}} (n_2 > 10) \qquad (3)$$

For example, a standard normal or Gaussian distribution may approximate the measure Z when $n_2>10$ units (with mean $\mu=0$ and variance, $\sigma^2=1$), wherein the distribution may range from −z to +z.

The significance probability p is then determined in the standard fashion by evaluating the following definite integral by a standard Taylor series expansion:

$$p = P(|Z| \leq z) = 1 - \int_{-|Z|}^{|Z|} (2\pi)^{-\frac{1}{2}} e^{\frac{x^2}{2}} dx \text{ where } P = a \text{ constant.} \quad (4)$$

As indicated in Equation (4), the Runs Tests calls for a 2-tailed probability calculation—the total area p from [(-∞) to (-|z|)] and [(+|z|)] to [(+∞)]. The Hypothesis Set is specified as discussed hereinafter.

The "probability of false alarm" (pfa) α may be selected, for example, to be either 0.05, or 0.01 or 0.001. The pfa is the likelihood of labeling a distribution "nonrandom" that is truly random in structure, an error that must be kept low to assure speeding up the signal processing, and minimizing wasteful effort which is a desirable effect.

The present inventive method assumes that the number of sample zeroes $n_2 > 10$ units, which, if not the case, then specialized probability tables are required, such as contained in: Handbook of Statistical Tables, 1962, D. B. Owen, Reading, Mass., Addison-Wesley Publishing Company.

A prior art partitioning scheme is well described in one or more of the related applications or patents listed hereinbefore. A novel partitioning scheme for the second stage of the present inventive method works as follows:

From prior engineering experience, a partitioning scheme for small sample time series data set in 3-space, is preferably based on the data rate. The data rate as used herein is the frequency with which data are received. For example, one measurement/sec. for 25 seconds yields 25 1-sec. measurements.

In a preferred embodiment, the statistical methods require that the partitioned subspace be populated with equal sized cubes ($\Delta x = \Delta y = \Delta z$). Thus, the following scheme describes a simple demarcation of the axes:

$$t_l = \min + (l-1)d, \quad (5)$$

$$l \ni (1, n), n = 1 + \frac{t_n - t_1}{d} \text{ for each axis } (n_X, n_Y, n_Z)$$

where, min=smallest observation for each dimension X, Y, Z d=interval size (selected by the user but preferably no less than the sampling rate in a time-series analysis. The interval size may possibly be higher to avoid artificially large number of subspaces $k=(n_x-1)(n_y-1)(n_z-1)$ represents the total number of partitions (The use of k here is distinguished from its use as a subscript for a z-axis observation.)

The primary constraint is that $\Delta t = t_l - t_{l-1}$ for each dimension x, Y, z.

This ends the brief discussion of the new partitioning scheme. Essentially the scheme turns the length of the axes into partitioned spaces with unitary intervals. This new scheme provides more (and smaller) subspace regions than the scheme of U.S. Pat. No. 6,597,634, discussed hereinbefore. In effect we are turning a small nonparametric sample test into a large sample test to increase its discriminatory power. This gives us the hedge required to reject the null hypothesis for truly nonrandom distributions and accept if for truly random ones. Moreover, the assumption, $n_2 > 10$, required for the large-sample approximation test is substantially likely to be satisfied. Accordingly, automated use of the inventive method can be employed.

A pictorial representation of the new partitioning scheme in 3-space follows with cells, such as cell 20 of FIG. 1, which are labeled for reference as $C_{ijk}$.

This provides a means for representation of a sample space, such as a hypothetical symbolic representation of the 4×4×4 sample space of FIG. 1. In this case, a partitioning scheme in accord with the present invention sets d=1, and x=0,1,2,3,4; Y=0,1,2,3,4; Z=0,1,2,3,4.

The subsystem assesses the random process binary hypothesis by testing:

$H_0: r = E(r)$ (Noise)

$H_1: r \neq E(r)$ (Signal+Noise)

The data distribution is labeled "random" if the null hypothesis, $H_0$, is accepted, i.e., the probability of the Z value $p \geq \alpha$. The alternative hypothesis, $H_1$, is accepted if $p < \alpha$ indicating that the total number of runs r is so small or so large to warrant the conclusion "by the Runs Test, there appears to be sufficient signal in these data to warrant further processing".

One prior art measure, as shown for example in U.S. Pat. No. 6,597,634, that is useful in the interpretation of outcomes is the R ratio, defined as the ratio of observed to expected occupancy rates:

$$R = \frac{m}{k\Theta} \quad (6)$$

where m=number of cells occupied, k=number of partitions, and $$\Theta = 1 - e^{\frac{N}{k}},$$

a Poisson parameter specifying the probability that a partition is nonempty.

The range of values for R indicate:

R<1, clustered

R=1, random

R>1, uniform It will be noted that the minimum $R=1/k\Theta$, and the maximum $R=N/k\Theta$. The R statistic is graphed as a linear function in a sample for $1 \leq m \leq N$. This measure is used in conjunction with the formalism just in deciding to accept or reject the "white noise" hypothesis.

The use of multiple correlation for 1 criterion (usually time), and c predictors in sample size N is employed to correct the paradox that nonrandom distributions may be deemed random by prior methods. This method is well known to those in the art. The multiple R is tested for its difference from 0 (randomness) using the following relation:

$$F(c, N-c-1) = \frac{\frac{R^2}{c}}{\frac{(1-R^2)}{(N-c-1)}}, \quad (7)$$

where the probability p of F value in (7) is evaluated by standard series expansions as described in Graham, et. al., U.S. Pat. No. 5,144,595. Letting the α (pfa) be 0.05, we say the R differs from zero if $p < \alpha$; otherwise $R \approx 0$.

An example of the present invention is now described wherein it will be understood that the data does not represent a time-series as all variables were randomized for illustrative purposes. Reference is made to FIG. 3 and to Table 2. In this example we assume that in one window, X=4 time or other units which is further subdivided (e.g., t=25 seconds or other units) with measured amplitudes of Y=4 and Z=4, each of which can be subdivided.

We select N. In the present example, 25 points are plotted in the graph and N=25.

The amplitudes are set. In this case, Y=4 Units; Z=4 units.

A false alarm rate α or (pfa) is set. For instance, let α=0.05.

The distribution is partitioned and binary coded. Below, in Table 2, are the raw data and results of the Runs Test for testing the hypothesis "noise only". Based on the partitioning scheme outlined hereinbefore, the distribution of ($\Delta x \times \Delta y \times \Delta z$) gives $4^3$=64 cubic subspaces (k=64) with integer intervals ($0 \leq X, Y, Z \leq 4$). A cell is scored 0 if no plot-point is present and a score of 1 if at least one-plot point is present.

Calculations are made based on the equations above that reveal that the data is "random" utilizing partitioning scheme as shown in Table 2.

The number of sample runs, r, is calculated. In this case, r=28 sample runs as shown in Table 2.

The mean and variance parameters of a random distribution are calculated. In this case, for $n_1$=19, $n_2$=45, $$E(r) = \frac{2n_1 n_2}{n_1 + n_2} + 1 = 27.719 \quad (n_2 > 10) \quad (8)$$

with a variance $\sigma^2$ or spread in the number of runs equal to:

$$\sigma_r^2 = \frac{2n_1 n_2 (2n_1 n_2 - n_1 - n_2)}{(n_1 + n_2)^2 (n_1 + n_2 - 1)} = 10.975 \quad (n_2 > 10) \quad (9)$$

The Gaussian statistic, Z, and probability P may then be calculated, for the present example.

$$z = \frac{r - E(r)}{\sqrt{\sigma_r^2}} = \frac{28 - 27.719}{\sqrt{10.975}} = 0.0852 \quad (10)$$

$$p = P(|Z| \leq z) = 1 - \int_{-|Z|}^{|Z|} (2\pi)^{-\frac{1}{2}} e^{-\frac{x^2}{2}} dx = 0.9321 \quad (11)$$

Supplemental tests may then be utilized, if desired. For instance, the R Statistic shows (by substituting $n_1$ for m):

$$R = \frac{m}{k\Theta} = \frac{m}{k\left(1 - e^{-\frac{N}{k}}\right)} = \frac{19}{64\left(1 - e^{-\frac{25}{64}}\right)} \approx 0.92 \quad (12)$$

FIG. 2 provides a hypothetical symbolic representation of a partitioning scheme in accord with the present invention with a "Runs Route" & binary coding for a three-dimensional. Runs Test. While different routes may be utilized, in the present example, the route begins at the origin 0,0,0, as indicated by line 26. Line 26 at X=1 and Z=1 shows the initial route across the $X_1$–$Z_1$ plane for changing y values. Then the route jumps to line 30 which starts with $Z_2$ at $X_1$ and again travels across the $X_1$–$Z_2$ plane for changing y values. This pattern continues. Finally, the route jumps to $X_4$ for Z=1, Z=2, Z=3 and Z=4, and ends with line 22 which shows the last motion of the counter for $X_4$ and Z=4 which routes across the $X_4$–$Z_4$ plane for changing y values. The cube provides 4×4×4=64 subspaces from which the sample runs count is made by counting the runs sequence among empty cells (scored 0) and non-empty cells (scored 1). Each cell is labeled with a $C_{ijk}$ notation ($C_{111}$ is first cell visited and $C_{444}$ is last). See Table 1 for an exemplary list.

In Table 1, the routes for lines 28, 30, 34, and 36 are shown, i.e., $X_1$ for Z=1, Z=2, Z=3 and Z=4, which produces 16-coordinate measures. Each cell is labeled $C_{ijk}$ and scored 0 or 1 (cell empty→0; non-empty→1). The sample number of runs r is tabulated. The notion of a sequence number labeling each cell appears in Table 2 for actual simulation data used to demonstrate the inventive method. For example, a point is placed in $C_{111}$ if data $0 \leq x \leq 1$; $0 \leq y \leq 1$; $0 \leq z \leq 1$; in $C_{144}$ if $0 \leq x \leq 1$; $3 \leq y \leq 4$; $3 \leq z \leq 4$, etc.

TABLE 1

| Sequence Number | X-Coor $x_i$ | Y-Coor $y_i$ | Z-Coor $z_i$ | Cell Label | Binary Score |
|---|---|---|---|---|---|
| 1 | $x_1$ | $y_1$ | $z_1$ | $c_{111}$ | 0 or 1 |
| 2 | $x_1$ | $y_2$ | $z_1$ | $c_{121}$ | 0 or 1 |
| 3 | $x_1$ | $y_3$ | $z_1$ | $c_{131}$ | 0 or 1 |
| 4 | $x_1$ | $y_4$ | $z_1$ | $c_{141}$ | 0 or 1 |
| 5 | $x_1$ | $y_1$ | $z_2$ | $c_{112}$ | 0 or 1 |
| 6 | $x_1$ | $y_2$ | $z_2$ | $c_{122}$ | 0 or 1 |
| 7 | $x_1$ | $y_3$ | $z_2$ | $c_{132}$ | 0 or 1 |
| 8 | $x_1$ | $y_4$ | $z_2$ | $c_{142}$ | 0 or 1 |
| 9 | $x_1$ | $y_1$ | $z_3$ | $c_{113}$ | 0 or 1 |
| 10 | $x_1$ | $y_2$ | $z_3$ | $c_{123}$ | 0 or 1 |
| 11 | $x_1$ | $y_3$ | $z_3$ | $c_{133}$ | 0 or 1 |
| 12 | $x_1$ | $y_4$ | $z_3$ | $c_{143}$ | 0 or 1 |
| 13 | $x_1$ | $y_1$ | $z_4$ | $c_{114}$ | 0 or 1 |
| 14 | $x_1$ | $y_2$ | $z_4$ | $c_{124}$ | 0 or 1 |
| 15 | $x_1$ | $y_3$ | $z_4$ | $c_{134}$ | 0 or 1 |
| 16 | $x_1$ | $y_4$ | $z_4$ | $c_{144}$ | 0 or 1 |

In FIG. 1 are 25 random points plotted as small circles within X-Y-Z space. The point indicated at 12 is labeled $x_1$, $y_4$, $z_2$ (x=0.16, y=3.5, z=1.2) and is assigned to the 8th cell in the Runs Route of FIG. 3 and Sequence #8 in Table 2 below (scored 1→point present). The point 38 is labeled $x_4$, $y_4$, $z_1$ (x=3.9, y=3.2, z=0.86) is assigned to the $52^{nd}$ cell of the runs route of FIG. 3 and sequence # 52 in Table 2 below (scored 1→point present). $C_{121}$, the 2nd cell in FIG. 1, is in sequence # 2 in Table 2 below (scored 0→cell empty).

Table 2 below shows runs sequence for stochastically random data of 25 points in FIG. 1. The numbers 1 to 64 represent the sequentially numbered cells of the counter for the 4×4×4 cube as described earlier in FIG. 3 and Table 1. Each cubic cell is assigned the value of 0 or 1. The raw data are presented below the table in X, Y, Z format. The data in the table below show that the number of sample runs r=28. A representative graphic plot of such data appears above in FIG. 1.

TABLE 2

| | | | |
|---|---|---|---|
| 1. 0 | 2. 0 | 3. 1 | 4. 0 |
| 5. 1 | 6. 0 | 7. 0 | 8. 1 |
| 9. 0 | 10. 0 | 11. 0 | 12. 1 |
| 13. 1 | 14. 0 | 15. 0 | 19. 0 |
| 17. 0 | 18. 0 | 19. 0 | 20. 0 |
| 21. 0 | 22. 0 | 23. 1 | 24. 1 |

TABLE 2-continued

| | | | | | | | |
|---|---|---|---|---|---|---|---|
| 25. | 0 | 26. | 0 | 27. | 0 | 28. | 1 |
| 29. | 0 | 30. | 1 | 31. | 0 | 32. | 1 |
| 33. | 0 | 34. | 0 | 35. | 1 | 36. | 0 |
| 37. | 1 | 38. | 0 | 39. | 0 | 40. | 0 |
| 41. | 1 | 42. | 0 | 43. | 0 | 44. | 0 |
| 45. | 1 | 46. | 0 | 47. | 0 | 48. | 0 |
| 49. | 1 | 50. | 1 | 51. | 1 | 52. | 1 |
| 53. | 0 | 54. | 0 | 55. | 0 | 56. | 0 |
| 57. | 0 | 58. | 0 | 59. | 1 | 60. | 0 |
| 61. | 0 | 62. | 0 | 63. | 0 | 64. | 0 |

The first sequence is cell 1, and the last sequence is cell 64.

$n_1 = 19$ (1's)

$n_2 = 45$ (0's)

r = 28 runs

E(r) = 27.72 runs expected in a random distribution with given $n_1$, $n_2$ data.

$r \approx E(r) \Rightarrow$ randomness

Below is an example of raw data of 25 X-Y-Z random coordinates produced in MATLAB. As an example, using this data in Runs Route $x_4$, $y_3$, $z_1$, where, x=3.7757; y=2.1529; z=0.2674, the data fall into the $51^{st}$ cell ($c_{431}$). This cell is scored 1.

| X | 3.7757 | 0.1648 | 1.9556 | 3.8263 | 0.4890 | 2.1196 | 0.5120 |
|---|---|---|---|---|---|---|---|
| Y | 2.1529 | 3.4552 | 3.0406 | 1.6547 | 3.2459 | 0.3768 | 2.2891 |
| Z | 0.2674 | 1.7227 | 1.1920 | 0.8956 | 2.2903 | 2.5215 | 1.0981 |
| X | 3.9036 | 3.2729 | 1.4175 | 0.6157 | 3.9891 | 2.2482 | 1.9257 |
| Y | 2.9877 | 1.5799 | 2.7122 | 3.2992 | 1.5682 | 0.7869 | 2.3379 |
| Z | 2.9784 | 0.5307 | 3.3932 | 2.0751 | 0.7787 | 1.0156 | 1.3782 |
| X | 2.2095 | 3.5152 | 1.3799 | 2.4930 | 2.2812 | 0.3226 | 3.9635 |
| Y | 2.6314 | 2.5562 | 1.1314 | 0.8702 | 0.8220 | 0.8598 | 3.1960 |
| Z | 1.3440 | 0.1011 | 3.5341 | 3.3692 | 1.3340 | 3.5956 | 0.8555 |
| X | 3.9506 | 0.3019 | 0.1805 | 1.2608 | | | |
| Y | 0.3411 | 3.2480 | 0.2371 | 1.4930 | | | |
| Z | 0.7883 | 3.0269 | 1.3246 | 3.7883 | | | |

In this example, the R value is 0.3471; $F(2,22) = 1.45$ (p=0.256>α=0.05; R≈0), with x as criterion (usually time); y & z as predictors.

A decision module may then be utilized in accord with the present invention. If any of the Tests is deemed "nonrandom", the data is considered "nonrandom"; otherwise the data is labeled "Random".

RUNS TEST: Since p=0.9320>α=0.05, we accept $H_0$ (noise only) and conclude the data represent a stochastically random data set. Thus we accept the null hypothesis of "noise only" and conclude this data distribution has no meaningful amount of "signal" in its structure (is random in behavior, perhaps "white noise").

The R TEST: The R-statistic lends further support to the judgment that the data are spatially stochastic. Thus, decision="random".

The Multiple Correlation: no relationship. Thus, decision="random".

Since all tests provide evidence that the data is random, the overall conclusion is that the data is random. We are now in a position to say that the "two-gate" method detects obviously random data with a fair amount of precision. However, it must be realized that caution is to be used with any statistical procedure for detecting every instance of a random or nonrandom distribution in a completely automated fashion. Periodic quality control "eyeball checks" should be used on the data streams to insure conformity of the processing.

The data is labeled "random" or "nonrandom" in accordance with the results of the decision module. Thus in this case, the Label="random".

The present invention, which is based on the Theory of Runs, is a) suitable for sparse data in signal processing for a time or other metric variable, and two measurements and b) enhances robustness of prior art methods by labeling nonrandom distributions correctly more often than prior art methods.

It will be understood that many additional changes in the details, steps, types of spaces, and size of samples, and arrangement of steps or types of test, which have been herein described and illustrated in order to explain the nature of the invention, may be made by those skilled in the art within the principles and scope of the invention as expressed in the appended claims.

What is claimed is:

1. A method for characterizing data in a three-dimensional space, said data being based on at least three measurable phenomena wherein a data point in said three-dimensional space is defined by one measurement of each of said at least three measurable phenomena, said method comprising the steps of:

providing a number N of said data points;

selecting a size of said three dimensional-space which contains all of said N data points;

partitioning said three-dimensional space into a plurality of smaller three-dimensional subspaces;

utilizing a three-dimensional runs test comprising:

providing a scoring system whereby each three-dimensional subspace is scored as a zero if no data point is located therein and as a one if at least one data point is located therein;

providing a predefined route passing through said three-dimensional space whereby said predefined route passes through every three-dimensional subspace only one time;

producing a series of ones and zeros by sequentially scoring each subspace along said predefined route with said scoring system, a total number of said ones produced during each predefined measurement route being equal to $n_1$, a total number of said zeros produced during each predefined measurement route being equal to $n_2$, $n_1+n_2$ being equal to a total number of said three-dimensional subspaces;

determining a total number of runs r in said series of ones and zeros whereby each run is a consecutive sequence of all ones or a consecutive sequence of all zeros;

selecting an acceptable false alarm rate α wherein said false alarm rate is a statistical likelihood of labeling said N data points as nonrandom when said N data points are actually random;

determining a probability p that r is within a statistically expected range of values for r if said N data points are random; and comparing p to α for producing a three dimensional runs test decision that said set of N data points is random or nonrandom.

2. The method of claim 1, wherein said three-dimensional space is described in terms of a three-dimensional Cartesian coordinate system with an x-axis, a y-axis, and a z-axis.

3. The method of claim 2, wherein each of said plurality of smaller three-dimensional subspaces comprises equal sized cubes of size $\Delta x = \Delta y = \Delta z$.

4. The method of claim 3, wherein said predefined route comprises a plurality of sweep lines, said method further comprising beginning a first sweep line at a first of said equal sized cubes in a first row of said equal sized cubes adjacent to an origin of said three-dimensional Cartesian coordinate system and proceeding with said first sweep line through said first row of said equal sized cubes in a direction in parallel to said y-axis until reaching a last of said equal sized cubes in said first row.

5. The method of claim 4, wherein after reaching said last of said equal sized cubes in said first row, jumping to a second sweep line, said second of said plurality of sweep lines beginning at a first of said equal sized cubes in a second row positioned at a distance $\Delta z$ from said first sweep line, said second sweep line proceeding in a direction parallel to said y-axis until reaching a last of said equal sized cubes in said second row.

6. The method of claim 3, wherein said predefined route comprises a plurality of sweep lines wherein said plurality of sweep lines extend through each of a plurality of rows of said equal sized cubes whereby said predefined route passes through each of said plurality of equal sized cubes only one time.

7. The method of claim 1, further comprising determining a mean E(r) and variance $\sigma$ if said N data points are random from $n_1$ and $n_2$ as follows:

$$E(r) = \frac{2n_1 n_2}{n_1 + n_2} + 1, \text{ and } n_2 > 10$$

$$\sigma_r^2 = \frac{2n_1 n_2(2n_1 n_2 - n_1 - n_2)}{(n_1 + n_2)^2(n_1 + n_2 - 1)} (n_2 > 10).$$

8. The method of claim 7, further comprising determining probability p as follows:

determining a Gaussian statistic $$Z = \frac{r - E(r)}{\sqrt{\sigma_r^2}}$$

wherein mean E(r) is assumed equal to 0 and variance $\sigma^2$ is assumed to be equal to 1;

determining a boundary $$Z = \frac{r - E(r)}{\sqrt{\sigma_r^2}}$$

wherein a random distribution range of said N data points extends from $-z$ to $+z$; and determining p such that $$p = (|Z| \le z) = 1 - \int_{-|Z|}^{|Z|} (2\pi)^{-\frac{1}{2}} e^{-\frac{1}{2}} dx.$$

9. The method of claim 1, wherein if $p>\alpha$, then producing a three dimensional runs test decision that said N data points are random, and if not then producing a three dimensional runs test decision that said N data points are nonrandom.

10. The method of claim 1, further comprising utilizing an R test comprising:

determining R such that:

$$R = \frac{m}{k\Theta}$$

where $m=n_1$,
$k=n_1+n_2$, and $$\Theta = 1 - e^{\frac{N}{k}}$$

is a Poisson parameter which specifies a probability that each three-dimensional subspace is nonempty.

11. The method of claim 10, wherein if R is within a selected range around one then producing an R test decision that said N data points are random.

12. The method of claim 10, wherein if:
R<1, then said N data points are determined to be relatively clustered within said three-dimensional space;
R=1, then said N data points are determined to be purely randomly located within said three-dimensional space; and
R>1, then said N data points are determined to be relatively uniformly located within said three-dimensional space.

13. The method of claim 11, wherein said three measurable phenomena comprises a first measurable phenomenon, a second measurable phenomenon and a third measurable phenomenon, said method further utilizing a multiple correlation test for estimating a combined influence of said second measurable phenomenon and said third measurable phenomenon on said first measurable phenomenon for determining whether said N data points are random or nonrandom.

14. The method of claim 13, wherein said first measurable phenomenon of said three measurable phenomena is time.

15. The method of claim 13, further comprising utilizing a decision module for evaluating results of said three dimensional runs test, said R test, and said multiple correlation test to determine whether to label said N data points random or nonrandom.

16. The method of claim 15, further comprising labeling said N data points as nonrandom if any one of said three dimensional runs test, said R test, or said multiple correlation tests determine that said N data points are nonrandom.

* * * * *

UNITED STATES PATENT AND TRADEMARK OFFICE
CERTIFICATE OF CORRECTION

PATENT NO. : 7,277,573 B1
APPLICATION NO. : 10/911757
DATED : October 2, 2007
INVENTOR(S) : Francis J. O'Brien, Jr.

Page 1 of 1

It is certified that error appears in the above-identified patent and that said Letters Patent is hereby corrected as shown below:

In Col. 1, line 17, replace "10/679,866" with --10/679,686--.

In Col. 1, lines 20-21, replace "filed on even date with the present application (Navy Case 83047)" with --United States Patent No. 7,409,323, filed 1 June 2004--.

In Col. 1, lines 23-24, replace "filed on even date with the present application (Navy Case 83992)" with --United States Patent No. 6,983,222, filed 1 June 2004--.

In Col. 1, lines 26-27, replace "filed on even date with the present application (Navy Case 83995)" with --United States Patent No. 7,103,502, filed 3 March 2004--.

In Col. 1, lines 29-30, replace "filed on even date with the present application (Navy Case 84264)" with --United States Patent No. 7,269,538, filed 1 June 2004--.

Signed and Sealed this

Eleventh Day of November, 2008

JON W. DUDAS
*Director of the United States Patent and Trademark Office*